(12) United States Patent  (10) Patent No.: US 7,922,078 B1
Putman et al.  (45) Date of Patent: *Apr. 12, 2011

(54) CASH DISPENSING AUTOMATED BANKING MACHINE MAINTENANCE SYSTEM AND METHOD

(75) Inventors: Harold V. Putman, Lexington, KY (US); Dale Klingshirn, North Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/380,018

(22) Filed: Feb. 20, 2009

Related U.S. Application Data

(60) Continuation of application No. 11/899,846, filed on Sep. 7, 2007, now Pat. No. 7,494,054, which is a division of application No. 11/488,212, filed on Jul. 17, 2006, now Pat. No. 7,267,265, which is a division of application No. 09/923,089, filed on Aug. 6, 2001, now Pat. No. 7,077,312, which is a continuation-in-part of application No. 09/233,249, filed on Jan. 19, 1999.

(60) Provisional application No. 60/233,157, filed on Aug. 7, 2000, provisional application No. 60/105,800, filed on Oct. 27, 1998.

(51) Int. Cl.
  *G06F 19/00*  (2006.01)

(52) U.S. Cl. ..................................................... 235/379
(58) Field of Classification Search .................. 235/379, 235/380
  See application file for complete search history.

(56) References Cited

U.S. PATENT DOCUMENTS 6,378,770 B1 * 4/2002 Clark et al. ................... 235/379

* cited by examiner

*Primary Examiner* — Seung H Lee
(74) *Attorney, Agent, or Firm* — Christopher L. Parmelee; Ralph E. Jocke; Walker & Jocke

(57) ABSTRACT

An automated banking machine (10) operates responsive to data read from data bearing records. The machine is operatively controlled from a front consumer user station (12) and a rear maintenance user station (14). The machine is operative to output a consumer user interface (28) through a front display device (16, 80). The consumer user interface includes interactive options for performing transactions with the machine including dispensing cash with a cash dispenser (32). The machine is further operative to output a maintenance user interface (30), through a rear display device (18, 82). The maintenance user interface includes options for configuring, troubleshooting, servicing and maintaining the machine. The operating system of the machine is operative to generate a desktop environment (84) that spans both the front display device and rear display device, such that a first portion (86) of the desktop is output by the first display device and a second portion (88) of the desktop is output by the second display device.

20 Claims, 9 Drawing Sheets

CASH DISPENSING AUTOMATED BANKING MACHINE MAINTENANCE SYSTEM AND METHOD

CROSS REFERENCE TO RELATED APPLICATIONS

This application is a continuation of U.S. application Ser. No. 11/899,846 filed Sep. 7, 2007, which is a divisional of U.S. application Ser. No. 11/488,212 filed Jul. 17, 2006 which is also a divisional application of U.S. application Ser. No. 09/923,089 filed Aug. 6, 2001 (now U.S. Pat. No. 7,077,312), which claims benefit of U.S. Provisional Application No. 60/223,157 filed Aug. 7, 2000 and is a continuation-in-part of co-pending U.S. application Ser. No. 09/233,249 filed on Jan. 19, 1999, which claims benefit of U.S. Provisional Application No. 60/105,800 filed Oct. 27, 1998. All of the above-listed applications are hereby incorporated herein by reference.

TECHNICAL FIELD

This invention relates to automated banking machines that operate responsive to data bearing records and which may be classified in U.S. Class 235, Subclass 379.

BACKGROUND ART

Automated banking machines are well known. A common type of automated banking machine used by consumers is an automated teller machine ("ATM"). ATMs enable customers to carry out banking transactions. Common banking transactions that may be carried out with ATMs include the dispensing of cash, the receipt of deposits, the transfer of funds between accounts, the payment of bills and account balance inquiries. The types of banking transactions a customer can carry out are determined by capabilities of the particular banking machine and the programming of the institution operating the machine. Other types of automated banking machines may allow customers to charge against accounts, to transfer funds and/or to cash checks or redeem other types of items. Other types of automated banking machines may print or dispense items of value such as coupons, tickets, wagering slips, vouchers, checks, phone cards, smart cards, food stamps, money orders, scrip or traveler's checks. For purposes of this disclosure a reference to an automated banking machine or an automated transaction machine shall encompass any device which carries out transactions including transfers of value.

ATMs have been developed which include both a front consumer user station and a rear service or maintenance user station. Each user station includes corresponding front and rear display devices and input devices. The front consumer user station typically includes a front consumer display that is publicly viewable and accessible. The front consumer display is generally associated with input devices such as a keypad and function keys which enable a consumer to perform transactions with the ATM. The rear maintenance user station is typically orientated in a position or location that is only accessible to individuals who maintain or service the ATM. Because the rear user station is generally used for maintenance purposes, it typically includes a rear maintenance display with access to the operating system and maintenance software. The rear maintenance display is typically associated with one or more computer input devices such as a full keyboard and a mouse device.

In systems with dual displays, the maintenance display (alternatively referred to herein as a rear display) is controlled by the operating system and provides access to a computer shell, window, or other standardized interface to the operating system of the ATM. The consumer display (alternatively referred to herein as a front display) is typically a "slave" device that is controlled by a terminal software program using proprietary drivers. If the terminal software program terminates, the proprietary drivers are no longer available to output new consumer screens to the front display device. Consequently, the front display typically goes blank or shows a frozen screen, while the rear display may remain active and responsive to inputs from the associated keyboard and/or mouse.

Because the front screen is a "slave" device that is dependent on proprietary drivers for output, a servicer cannot use the front screen to run and interact with conventionally written programs. Only programs that are operatively programmed to access the hardware specific proprietary drivers of the display will have the ability to output a user interface on the front display. Such a design requires a more complex terminal software program with operative low level hardware dependent programming. In addition, if a different display hardware is implemented for the ATM, the terminal control software must be rewritten to interface with the new proprietary drivers that correspond to the new display hardware.

The consumer displays of ATMs typically do not have associated input devices such as full keyboards and pointing devices. Any program that can be accessed through the front display must be operatively programmed to accept inputs from more limited input devices, such as keypads, touch screens, and function keys. To enable programs to be accessible from both the front and rear displays, separate front and rear interface programs may be created for dual display ATMs. Each of the front and rear interface programs are written to accept inputs from the specific types of input devices associated with the respective front and rear displays. For example a mouse device has the ability to easily move to and click a specific user interface element placed anywhere on a user interface window. This functionality enables ATM terminal software programmers to use a complex assortment of user interface elements such as scroll bars, buttons, list boxes, hypertext links, text boxes, tab controls, tree views and option buttons. Although such user interfaces are easily manipulated with a mouse at the rear display of an ATM, such user interfaces are very difficult to work with at the front display due to the more limited nature of available input devices such as function keys and keypad buttons.

Thus when a maintenance software program is required to be accessed from the front consumer display of the ATM, a separate front user interface program must be developed which is less complex and more easily accessed by input devices typically found in association with the front consumer display. Developing different user interface programs responsive to different input devices can consume a significant amount of programming effort.

ATM applications have been developed using a plurality of different operating systems such as Microsoft® Windows® NT and IBM® OS/2®. In addition for each targeted operating system more than one type of application development tool or version of the tools may be used. For example with a Microsoft® Windows® NT operating system different C++ compilers from Microsoft®, IBM and other tool providers may be used to build ATM applications.

Unfortunately, when developing ATM applications different sets of source code must be written and maintained for each targeted operating system platform and software development tool. Although much of the source code is the same or similar for each targeted platform, incompatibilities between the operating systems platform and the foundation classes of the development tools typically require different sets of source code to be written. Maintaining completely separate sets of source code for each targeted platform decreases the productivity of ATM software developers.

When multiple developers are working to maintain ATM applications targeted for different platforms, each development workstation must include at least one installation of a development tool that is capable of compiling and building the ATM application. Although it may be desirable to install more than one development tool on a development workstation, in many cases the incompatibilities between different compilers and their configuration on a workstation makes it impractical to do so.

Also, when more than one developer is working on a common set of ATM source code, there exists the possibility that one developer may be using a different version or configuration of a development tool than another developer. When this occurs, unobvious bugs can be introduced into ATM applications. Although this problem can be solved by having each developer run a shared compiler from a network source rather than from a local hard drive installation, development tools that are run from a network tend to be relatively slow and result in a decrease in programmer productivity.

Consequently there exists a need for improvements relating to ATM terminal software.

DISCLOSURE OF INVENTION

It is an object of an exemplary form of the present invention to provide an automated banking machine at which a user may conduct transactions.

It is a further object of an exemplary form of the present invention to provide an automated banking machine that may be operated through a plurality of user stations such as either a front user station or a rear user station.

It is a further object of an exemplary form of the present invention to provide an automated banking machine that may provide both a front publicly available consumer display and a rear non-public maintenance display.

It is a further object of an exemplary form of the present invention to provide an automated banking machine with a simplified programming architecture for the development of terminal control software and maintenance software for a multiple display machine.

It is a further object of an exemplary form of the present invention to provide an automated banking machine with terminal control software that does not require hardware specific programming for proprietary display devices.

It is a further object of an exemplary form of the present invention to provide an automated banking machine with terminal control software that does not require multiple user interfaces to be developed for different sets of input devices at the front and rear displays.

It is a further object of an exemplary form of the present invention to provide a method of developing automated banking machine applications for different platforms that reduces the amount of duplicated source code that must be written and maintained.

It is a further object of an exemplary form of the present invention to provide a method of developing automated banking machine applications for different platforms that enables a more practical and productive method of using multiple development tools from the same development workstation.

It is a further object of an exemplary form of the present invention to provide a method of developing automated banking machine applications for different platforms that reduces the risk that multiple developers will accidently build and compile shared source code with different versions of a development tool.

Further objects of the present invention will be made apparent in the following Best Modes for Carrying Out Invention and the appended claims.

The foregoing objects are accomplished in an exemplary embodiment of the invention by an ATM that includes at least two user stations in operative connection with a computer. A first one of the user stations includes at least one publicly available display device and at least one publicly available input device. A second one of the user stations includes at least one non-publicly available display device and at least one non-publicly available input device. In the exemplary embodiment the first user station is generally configured as a consumer user station, where customers of the ATM can perform transaction functions with the ATM. The second user station is generally configured as a service or maintenance user station, where servicers of the ATM can perform maintenance related functions with the transaction function devices and software applications of the ATM. In one exemplary embodiment the first consumer user station is generally located at the front of the ATM while the second maintenance user station is generally located at the rear of the ATM.

The exemplary embodiment of the present invention includes output devices such as a display screen and/or an audio system. The exemplary embodiment further includes input devices such as a touch screen, keypad, mouse, touch pad, trackball, pointer, biometric scanners and/or speech recognition system. The ATM further includes transaction function devices such as a dispenser mechanism for sheets of currency or other sheets, printer mechanisms, a card reader and/or writer, a check or other document readers, a depository mechanism and other transaction function devices that are used by the machine in carrying out transactions. In the exemplary embodiment the computer is in operative connection with each of the output devices and the input devices as well as with the sheet dispenser mechanism, card reader and other physical transaction function devices in the ATM.

Each of the display and input devices for the front consumer and rear maintenance user stations is generally controlled through the operating system of the computer. For one embodiment of the present invention, the input devices for the consumer user station include function keys and a keypad. However, in general a consumer user station may include any input device which allows a consumer to interact with the ATM to perform transactions representative of transfers of value. The maintenance user station of this described embodiment includes other computer type input devices such as a full keyboard and mouse. However, in general the maintenance user station may include any input device that enables a servicer to readily maintain and configure an ATM.

In the exemplary embodiment the operating system is placed in a mode which is operative to output a desktop shell environment which produces a visual field that spans both the first and second display monitors. Such a visual field output is referred to herein as a desktop environment or desktop. The first display outputs a first portion of the operating system desktop environment and the second display outputs a second portion of the desktop environment. This dual monitor feature effectively increases the size of the desktop. When a mouse or other pointer device is moved across the desktop responsive to the physical movement of a mouse device, the corresponding pointer will automatically jump between display devices responsive to which portion of the desktop environment the mouse pointer is located. Regardless of which monitor is outputting a particular window for an application, the application will receive keyboard inputs. Such capability can be used in an automated banking machine to use several discrete display devices to provide a single large output. This can be used to advantage particularly to provide a large consumer display. Compared to the cost of purchasing a single very large monitor, using multiple relatively smaller monitors provides a relatively inexpensive method for increasing the amount of desktop real estate.

Exemplary embodiments of the present invention take advantage of platforms which offer multiple monitors by configuring and orientating the monitors in an alternative manner. Rather than placing monitors adjacent to each other to effectively increase the size of the working display for a single user, the exemplary embodiment may use each display device as a separate user station, with one publicly available to consumers and one privately available to servicers.

In this manner a consumer terminal control software application is operative to output a consumer user interface in the first portion of the desktop being output through a front consumer display device. A maintenance program is operative to output a maintenance user interface in the portion of the second desktop being output by the rear maintenance display device. Even though the computer and operating system of the ATM is outputting a common desktop, a consumer can perform transactions using the consumer user interface on the first portion of the desktop while a servicer can simultaneously perform maintenance functions with the maintenance user interface on the second portion of the desktop.

In the exemplary embodiment when a pointer input device such as a mouse or track ball is connected to the computer adjacent the rear maintenance display, the computer is operatively programmed to prevent the associated mouse pointer display output from moving from the second portion of the desktop to the first portion of the desktop. This behavior is achieved in the exemplary embodiment by employing a software feature referred to as a hook application which processes mouse messages prior to the operating system moving the mouse pointer. When the hook application determines that a mouse input corresponds to a movement of the mouse pointer from the second portion of the desktop to the first portion of the desktop, the hook application is operative to maintain the location of the mouse pointer on the second portion of the desktop. This behavior prevents the outputting of a mouse pointer on the front consumer display. Thus when a servicer is using the mouse with the rear maintenance display, a consumer will not be able to view the mouse pointer.

In exemplary embodiments of the present invention the consumer display device may include a touch screen input device adjacent the front of the display. The touch screen enables a user to generate pointer type input signals by touching or sliding a finger adjacent the device. The previously discussed exemplary hook application may also be used to prevent the mouse pointer from jumping to portions of the desktop that corresponds to the user's touch screen inputs.

In addition the default behavior of a computer system connected to a touch screen input device is often operative to send a signal to the operating system to move the input focus to the application window being touched. For example if the user at the front consumer display touches a portion of the touch screen that corresponds to a user interface screen, the touch screen may send the operating system a message to give the consumer user interface input focus. When the consumer user interface gets the input focus with a touch screen input, any application a servicer may be using with the rear maintenance display will lose input focus. For example, if a servicer is typing information using a keyboard into a maintenance user interface, all keystrokes will be lost when the input focus switches to the consumer user interface.

The exemplary embodiment solves this problem by being operatively programmed to monitor events which move the input focus to a consumer user interface application. When such events occur, the computer is operatively programmed to automatically return the input focus to the maintenance user interface application which previously had the input focus. In one exemplary embodiment this functionality is achieved by using a hook application like that previously mentioned in connection with mouse messages. In other exemplary embodiments, consumer user interface applications are operatively programmed to invoke a return focus method in response to receiving the input focus.

The exemplary embodiment of the present invention is operative to display corresponding user interface windows for an application on either the rear maintenance screen or the front consumer display. This feature enables a servicer to perform maintenance operations with a maintenance application while standing adjacent either the front display or rear display of the ATM. In some machines transaction function devices are maintained and serviced at the rear of the machine. However, the ability to test and diagnose problems with transaction function devices from the front of the ATM is beneficial. For example by standing at the front of the ATM, the servicer can test the dispensing ability of a cash dispenser or printer. The servicer may also test the input ability of devices such as a card reader or depositor. By operating maintenance software from the front consumer display the servicer can better diagnose and repair problems from the perspective of a consumer. Also in machines that have consumer displays and maintenance displays on the same side of the machines there are situations in which it may be advantageous for a servicer to perform service functions using the customer display and input devices.

Unfortunately, many consumer input devices are not of the same type or do not have the same capabilities as input devices adjacent the maintenance display. For example, a mouse or other pointer device is not typically available to a servicer at the consumer display of the ATM. Thus a maintenance user interface that includes user interface elements such as drop down list boxes and scroll bars would be very difficult to use with consumer input devices such as function keys.

One approach to solving this problem is to write a separate maintenance application with a user interface that corresponds to input devices for either the consumer or maintenance user station of an ATM. However, such an approach may double the amount of maintenance software that is required to service an ATM. The exemplary embodiment of the present invention includes a software architecture that reduces the need to write separate user interfaces for different combinations of input devices. User interfaces developed in the exemplary embodiment employ documents which include hardware independent command instructions for generating user interface elements. These instructions are interpreted differently by a document viewer user interface program responsive to the input devices associated with the particular user station that are used to interact with the user interface.

For example a command instruction to generate a command option is interpreted by the document viewer at the rear maintenance display as a mouse clickable button. However, the same instruction for the consumer display is output by the document viewer as a function key indicator which points to which physical function key is operative to trigger the command option. Examples of such a programming architecture for automated banking machines are shown in U.S. patent application Ser. No. 09/233,249 which is incorporated herein by reference in its entirety as if fully rewritten herein.

In the exemplary embodiment software applications for performing maintenance tasks with the automated banking machine include hardware specific functions which are decoupled from the user interface documents. In this manner the user interface portions of the software and the hardware specific functions can be independently developed and maintained. In the exemplary embodiment the user interface documents include XML formatted command instructions which define features of the user interface. The hardware functions are placed in event processor DLLs which are called by the document viewer in response to a user interface event. The user interface command instruction in addition to defining features of the user interface also specifies which event processors are to be called in response to user interface events.

The exemplary document viewer is operative to output a corresponding user interface for the front and rear displays responsive to the types of input devices that are available adjacent thereto or which are designed to be operatively interactive therewith. This feature enables a developer of ATM software to concentrate on the features of the user interface without lost time developing different versions of the user interfaces for different types of input devices. Thus a developer can implement a single document with command instructions that define the desired functionality of a user interface. The exemplary document viewer responsive to this single document will generate different user interfaces based on the capabilities of the display and associated input devices. In the exemplary embodiment the document viewer is configured with a listing of which input devices are associated with which display device. The user interfaces are generated responsive to this input device configuration listing.

In addition the exemplary embodiment of the present invention is further operative to simplify the development of language specific user interfaces. In general, automated banking machines have included different sets of user interface screens for each human language that is desired for the ATM. Any changes in layout or functionality to the user interface require that each alternative language specific user interface be updated as well. The exemplary embodiment is operative to simplify this process by associating identification values with each user element defined in a user interface document. Such documents also include text labels for individual user interface elements which may be in a default language such as English. The exemplary process simplifies translations by substituting command instructions with labels in one human language for corresponding command instructions with labels in another human language based on a determination of matching identification values.

In one exemplary embodiment the alternative command instructions with translated labels are saved in language specific documents with the same name as the primary document but located in language specific subdirectories. When the document viewer generates a user interface, it is operative to determine a target language for the user interface. The document viewer then locates at least one alternative language document which may have the same name as the primary document. The document viewer then substitutes all command instructions in the default language of the user interface document with corresponding command instructions in an alternative language document based on matching ID values. Alternative embodiments may employ other methods of storing associated alternative language labels, including placing the alternative language labels in the primary document.

The exemplary embodiment of the present invention is designed to be backward compatible with prior art ATMs. In particular the exemplary embodiment is operative to generate a consumer user interface responsive to escape code sequences received from a remote host computer which define the layout and functionality of the consumer user interface. In prior systems the terminal control software drives the output of a "slave" display device responsive to the escape code sequences. The exemplary embodiment is operative to output the consumer user interface by generating the user interface on the portion of the desktop being output through the consumer display. By taking advantage of high level drawing libraries of the certain operating systems, the present invention eliminates the need to write code targeted to specific proprietary slave drivers. In embodiments of the present invention that run on a Windows® 2000 type platform, high level interfaces such as Direct Draw and Direct Show can be used to generate the consumer user interface. Consequently any graphics board, video board, MPEG hardware or other display device that includes Direct Draw and Direct Show drivers may be used with the exemplary terminal control software to generate consumer user interfaces.

In systems with "slave" consumer displays, when the terminal control software exits prematurely or locks up, the consumer user interface becomes inoperative. However the default behavior of dual monitor configurations is that if the terminal control software exits prematurely, the background of the desktop may be visible and accessible by users of the consumer display. This behavior may be undesirable for ATM applications. Consequently the exemplary embodiment includes a blank screen application that is operative to independently generate a blank screen which covers the area of the desktop being output by the consumer display device. In one exemplary embodiment the blank screen output is located in a layer that is between the consumer user interface and the desktop, such that when the user interface is shut down or terminates, the blank screen will be the top application and will hide the desktop.

In other exemplary embodiments the blank screen application is operative to receive screen data from either the terminal control software or maintenance application software. The blank screen application generates a corresponding consumer or maintenance user interface responsive to the screen data on the portion of the desktop being output by the consumer display. When the terminal control software exits, the blank screen can be sent an exit message which prompts the blank screen application to display a blank user interface with a message indicating that the ATM is out-of-service. Also when the maintenance application requires the ATM to be taken offline, the maintenance application is also operative to send the blank screen application a message which prompts the blank screen application to display a similar out-of-service message with the consumer display device. Further embodiments of the present invention are operative to receive escape code sequences from a host corresponding to outputting unicode fonts, palettized windows, MPEG videos, HTML documents, and other multimedia files or indicia that can be output on a portion of the operating system desktop.

The exemplary embodiment of the present invention may be used in conjunction with a method of building and compiling ATM source code that is targeted for different platforms. Rather than having each development workstation include one or more local copies of different types and versions of development tools, in the exemplary embodiment the compiler for each development tool is organized and stored on a separate removable medium such as a CD-ROM, Zip disk or any other portable storage device.

When the developer wishes to compile ATM source code, the workstation is placed in operative connection with the portable medium and a configuration script for the particular type and version of the compiler is executed. The configuration script modifies the workstation in a manner which enables the workstation to run the compiler from the portable medium. When a new compiler is required, the original portable medium is rendered operatively disconnected from the workstation and a second portable medium with the new compiler stored thereon is placed in operative connection with the workstation. The corresponding configuration script for the new compiler is executed on the workstation enabling the workstation to compile ATM source code using the new compiler on the second portable medium.

For example, in one exemplary embodiment, a Microsoft® C++ compiler is stored on a first CD in such a manner than it may be executed from one or more workstations after running a corresponding first configuration script. In addition an IBM C++ compiler is stored on a second CD in such a manner that it may be executed from one or more workstations after running a corresponding second configuration script. When developers wish to compile ATM source code with any one of the compilers, they must place the desired CD into their workstation's CD reader and run the corresponding configuration script.

In the exemplary embodiment each compiler from each CD or other portable medium is executed responsive to a standard make instruction set. The standard make instruction set is adapted for use with a plurality of different targeted ATM platforms and versions of development tools. Thus the standard make is operative to have the compiler include the correct set of libraries that correspond to the targeted platform or version of development tool. In this manner the platform specific code is separated into independent libraries from the common source code that is compatible with each platform. Consequently ATM developers are enabled to generate common source code for a plurality of different ATM platforms. When the targeted application is compiled, the standard make file is operative to make sure the correct platform specific libraries are linked and integrated into the desired platform specific distribution of the ATM application.

BEST MODES FOR CARRYING OUT INVENTION

Figure 1:
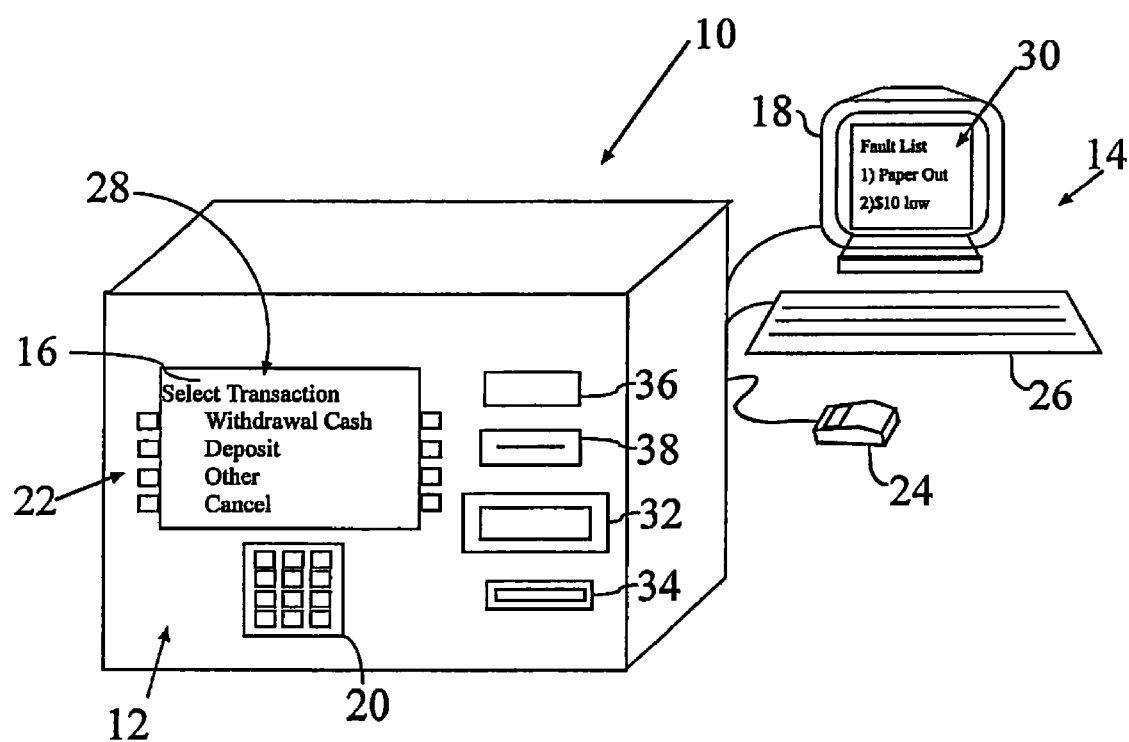
FIG. 1 is a perspective view of a first exemplary embodiment of an ATM system of the present invention.

Referring now to the drawings and particularly to FIG. 1, there is shown therein a perspective schematic view of an automated banking machine 10 of one exemplary embodiment of the present invention. The exemplary automated banking machine 10 includes at least two user stations 12 and 14 at which users can interact with the machine 10. Each user station includes at least one output device 16 and 18 in operative connection with the machine 10. Examples of output devices include audio devices such as speakers, display devices such as CRT monitors and LCD screens, or any other type of device capable of outputting a visual, audible, or other sensory perceptible user interface. The output devices 16 and 18 may also encompass ports, buses and/or wireless transmitters which are operative to output electronic representations of user interfaces to external devices such as headphones, computers, terminals, mobile phones, laptops, PDAs, or any other device that is operative to convert electro-magnetic, optical or other signals into a perceptible user interface.

In the exemplary embodiment of the present invention each user station also includes at least one input device such as a touch screen sensing array, keypad, function keys, pointing device, microphone or other device that is operative to accept input signals from a user of the machine 10. As with the exemplary output devices, the exemplary input devices for the present invention may also encompass ports, buses and/or wireless receivers which are operative to receive electronic representations of user inputs from external devices such as computers, terminals, mobile phones, laptops, PDAs, microphones or any other device that is operative to convert user inputs into electro-magnetic, optical or other signals.

For each user station, each display device is generally associated with at least one adjacent input device. In the exemplary embodiment the first user station 12 is located at the front of the machine and is primarily intended for use by consumers to perform transactions. The display device 16 is operative to output a user interface 28 that includes a plurality of selectable options for operating the machine. The exemplary front display device 16 is associated with input devices such as a keypad 20 and function keys 22 which enable a consumer to interact with the user interface 28.

In the exemplary embodiment the second user station 14 is generally located at the rear of the machine and is primarily intended for use by authorized users for the maintenance and servicing of the machine. The display device 18 is operative to output a user interface 30 that includes a plurality of selectable options for the maintenance, configuration and servicing of the machine. The display device 18 also provides authorized users with access to a shell, window or command prompt for interacting with functions provided by the operating system of the machine 10. Because the complexity of the input requirements for servicing and configuring the machine are generally higher than for conducting consumer transactions, the rear user station 14 may include different and/or relatively more flexible input devices than the front user station such as a full keyboard 26 and a pointing device 24.

The automated banking machine 10 further includes a plurality of transaction function devices that enable the consumer to perform transactions. Examples of such transaction function devices include a sheet or cash dispenser 32, depositor 34, receipt printer 36, and card reader 38. These transaction function devices are exemplary and embodiments of the invention may include other types and combinations of transaction function devices. In the exemplary embodiment of the present invention a servicer is also enabled to operate, maintain and troubleshoot the transaction function devices using an appropriate user interface at either the front or rear user stations.

Figure 2:
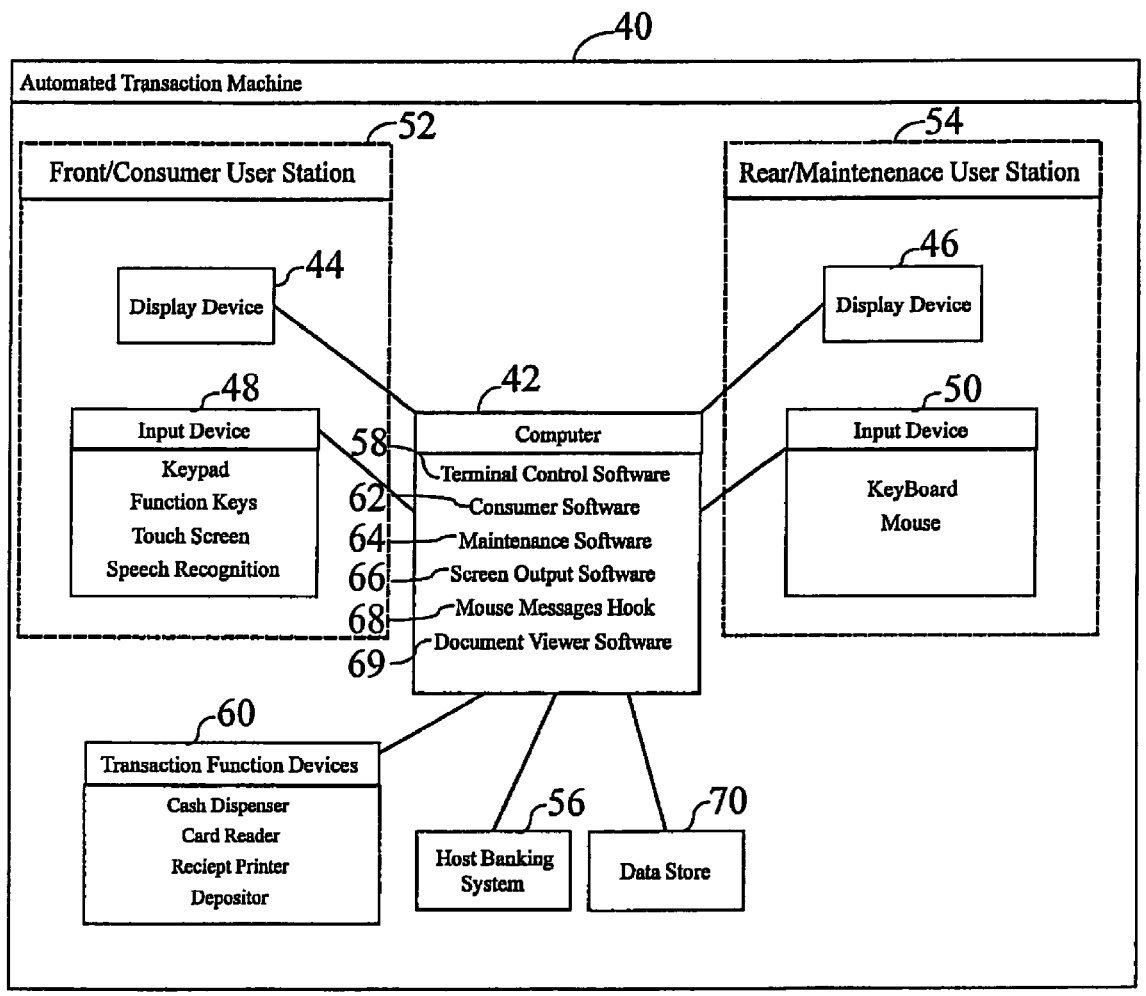
FIG. 2 is a schematic view of an exemplary embodiment of an ATM system of the present invention.

FIG. 2 is representative of a schematic view of one exemplary embodiment of the present invention. Here the automated banking machine 40 includes at least one computer 42. Each of the display devices 44, 46 and input devices 48, 50 of the respective user stations 52, 54 are in operative connection with the computer 42. The transaction function devices 60 are also in operative connection with the computer. The exemplary embodiment of the machine 40 is further in operative connection with a device for communicating with a remote host banking system 56 for purposes of authorizing transactions, performing inquiries, transferring value and communicating any other types of status, command and authorization messages with the host system.

The exemplary machine 40 includes a plurality of software applications operative in the computer 42. The software applications include a plurality of terminal control software components 58 which are operative to generate user interfaces with the display devices 44, 46, to process inputs from input devices 48, 50, to communicate with the host banking system and to control the operation of transaction function devices 60. The exemplary terminal control software components include a consumer software application 62 which is operative to generate a consumer user interface for output through the front or consumer display device 44. The terminal control software components also include a maintenance software application 64 which is operative to generate a maintenance user interface for output through the rear or maintenance display device 46.

Although the consumer user interface is typically output with the front display device 52 and a maintenance user interface is typically output with the rear display device 46, it is to be understood that in the exemplary embodiments of the present invention the consumer software application may further be operative to output a consumer user interface with the rear display 46 and the maintenance software application may further be operative to output a maintenance user interface with the front display 44. As will be discussed further herein, embodiments of the exemplary terminal control software may further include a screen output software application 66, a mouse messages hook 68 and a document viewer software application 69.

In the exemplary embodiment of the present invention, software components, documents, configuration values, data stores and any other portion of software or data that comprises the terminal control software is stored in at least one data store 70 that is in operative connection with the computer 42. The data store may include a local file system or database. However in alternative embodiments the data store may be located on a network and may be accessed through one or more server computers and server software applications.

Figure 3:
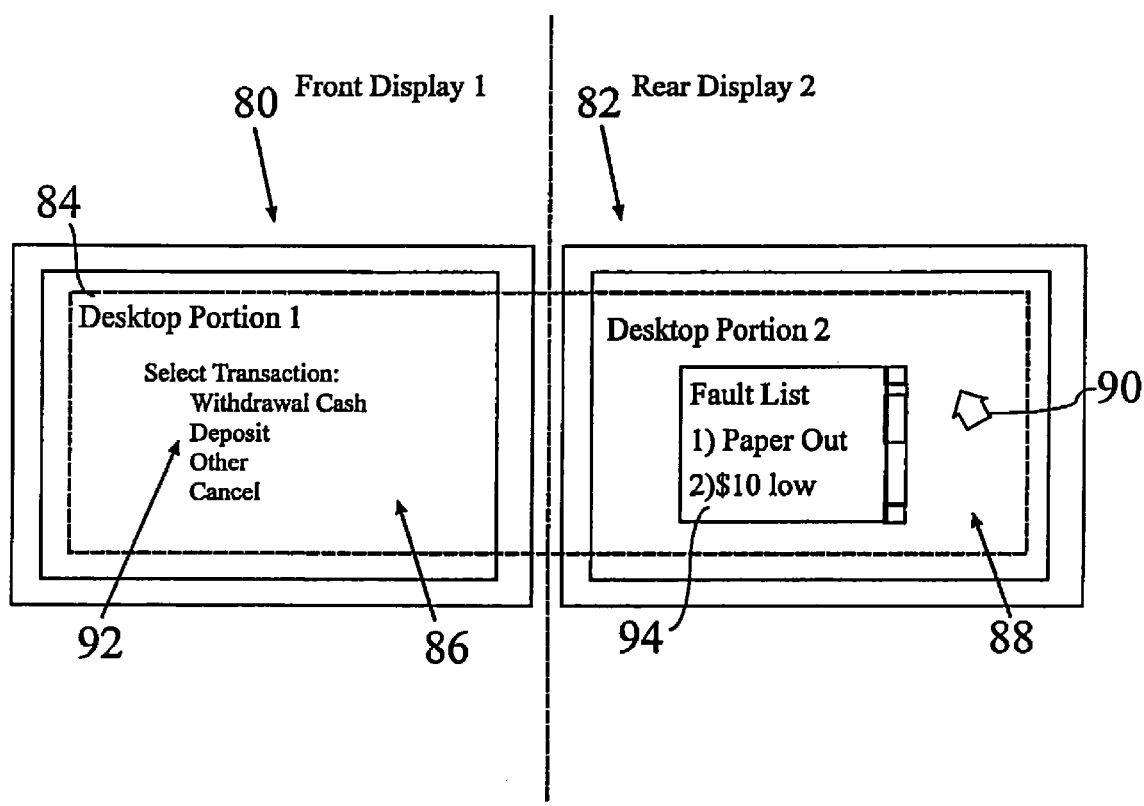
FIG. 3 is a schematic view representative of the relationship between the exemplary display devices of the present invention and an operating system desktop environment.

The exemplary embodiment of the present invention is operative to output a desktop environment of the computer's operating system that spans at least two display devices. FIG. 3 is representative of an exemplary dual display configuration for the machine. For purposes of showing the relationship between the operating system's desktop environment and the display devices, FIG. 3 shows the consumer display device 80 which in this embodiment is a front display on the machine, adjacent the maintenance display device 82 which in this exemplary embodiment is a rear display. However, it is to be understood that in exemplary embodiments of the present invention the front and rear displays may be orientated such that the output of both displays may not be viewable at the same time from a single vantage point. It should also be understood that in some embodiments the front and/or rear displays may comprise a plurality of displays or other devices which are spanned by a designated portion of the desktop.

As shown in FIG. 3, in the exemplary embodiment the computer of the machine is operative to output a first portion 86 of the desktop environment 84 through the first display device 80. The computer is further operative to output a second portion 88 of the desktop environment 84 through the second display device 82. In one exemplary embodiment the computer includes an operating system such as Microsoft® Windows® 2000 which provides built-in operating system support for multiple monitors, however the present invention encompasses the use of any operating system and/or video hardware that includes support for multiple monitors.

In general, multiple monitor support in an operating system and/or video display hardware enables the user interface of any single application to be moved from a first monitor to a second monitor by dragging the user interface with a pointing device from one portion of the desktop to another portion of the desktop. The effective increase in the size of the desktop provides more desktop real estate for additional windows and applications to run without overlapping.

The exemplary embodiment of the present invention uses the multiple monitor support of the operating system and/or video hardware to create the two previously described interfaces at the front and rear user stations. In a typical configuration of the present invention, a user interface 92 generated by a consumer software application is placed on the desktop portion 86 being output by the front display device 80, while a user interface 94 generated by a maintenance software application is placed on the desktop portion 88 being output by the rear display device 82. The exemplary terminal control software components are operatively programmed to maintain the user interfaces 92, 94 within the coordinates that define respective desktop portions 86, 88.

A pointer device such as a mouse is operative to output a pointer indicia 90 such as an icon, which generally can be moved between the first desktop portion 86 and the second desktop portion 88. With the present exemplary embodiment this behavior may sometimes be undesirable because it enables a servicer at the rear display device to move the mouse pointer to the front display device which may at times be in use by a consumer. To prevent this behavior the present exemplary embodiment uses the mouse message hook schematically indicated 68. The mouse message hook is a software component that in this embodiment suppresses pointer indicia. The message hook is operative to intercept mouse type messages before the messages are acted upon by the operating system. The mouse message hook is operatively programmed to determine if the mouse message corresponds to the mouse pointer moving to or being in the first portion 86 of the desktop. When such a message is detected the mouse message hook is operative to maintain the output of the mouse pointer 90 on the second portion 88 of the desktop. When the mouse message is determined to correspond to the mouse pointer staying on the second portion 88 of the desktop, the exemplary mouse message hook is operative to allow the operating system to continue handling the event, and the input messages from the mouse continue to be received by the operating system to produce the indicia in the interface. It should be understood that while in this embodiment the output indicia for a pointer position is suppressed for an entire desktop portion, in other embodiments outputs may be suppressed in other selected areas of the desktop and/or other output types may be suppressed.

Also with the use of multiple monitors, when a consumer taps a touch screen device in operative connection to the front display device 80 or provides other types of inputs, the customer user interface 92 at the front display device 80 will be given input focus by the computer system in the machine. In some circumstances this behavior is undesirable because keystrokes being input into the maintenance user interface 94 at the rear display 82 may be lost when the maintenance user interface 94 loses input focus to the customer user interface 92.

The exemplary embodiment of the present invention is operative to prevent this behavior by monitoring the focus change events or messages which move the input focus from the maintenance user interface 94 on the rear display device 82 to a consumer user interface 92 on the front display device. In one exemplary embodiment one or more consumer software applications are operative to detect when the focus is being moved to a consumer user interface 92. If this event occurs the consumer software application is operatively programmed to cause the computer to automatically move the input focus back to the maintenance user interface 94 which previously had input focus. Automatically returning input focus back to the original maintenance user interface 94 has the effect of minimizing the loss of keystrokes and other inputs for the maintenance user interface application.

In certain exemplary embodiments of the present invention it may be desirable to enable a servicer to maintain and configure the automated banking machine from the consumer user station as well as the maintenance user station. However, as a consequence of providing different types of input devices at each user station it is often desirable to have different user interfaces for each user station. The different user interfaces are adapted for interaction with the corresponding input devices that may be associated with or adjacent to that user station. Although customized user interfaces may be programmed for each user station, the exemplary embodiment of the present invention is operative to automatically output user interfaces targeted for specific types of input devices based on a single common user interface document.

Figure 4:
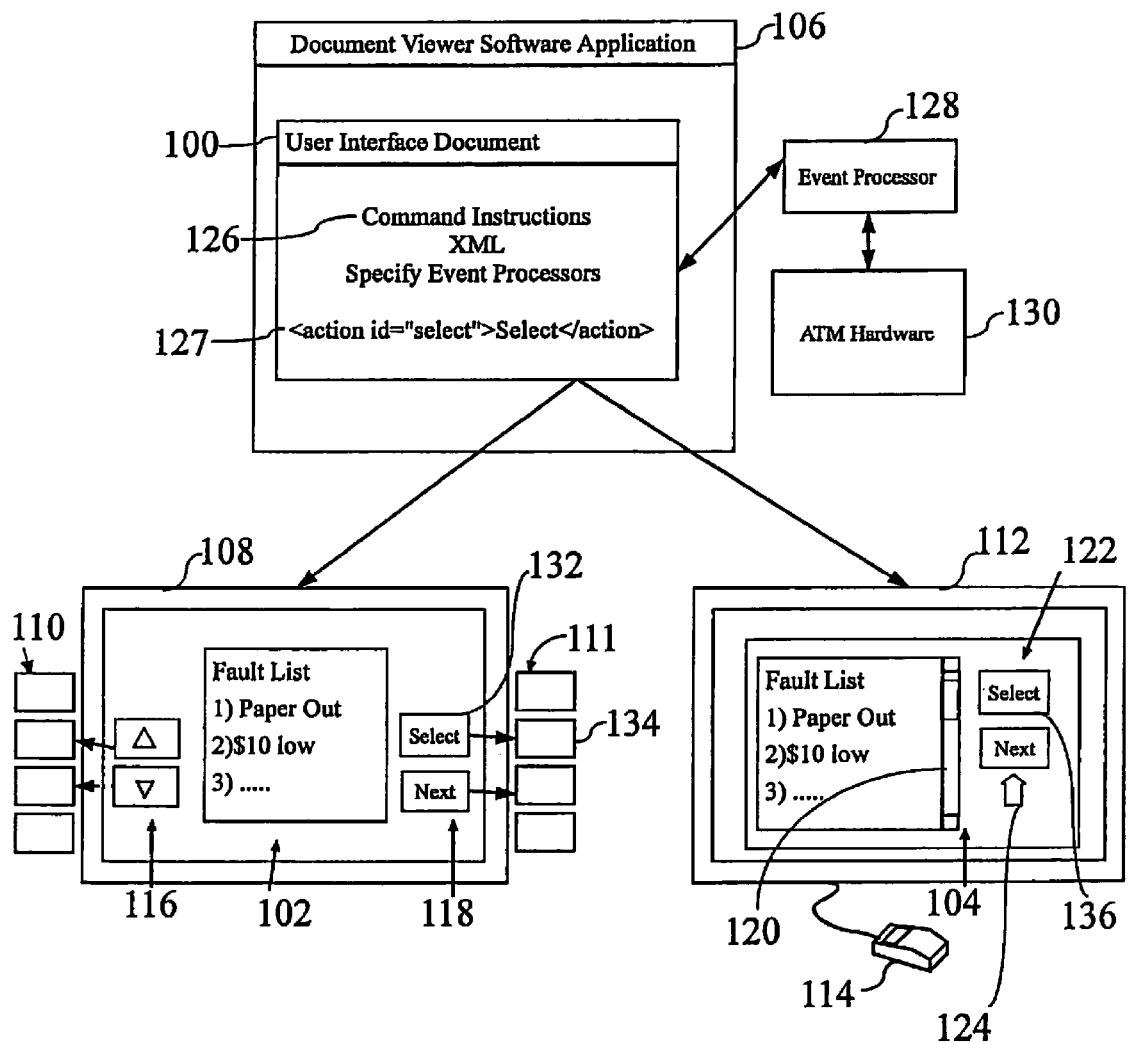
FIG. 4 is a schematic view representative of an exemplary front and rear maintenance user interface being output responsive to a single common user interface document.

FIG. 4 shows an example of different user interfaces 102 and 104 that can be produced from a common user interface document 100. In this exemplary embodiment the computer includes a document viewer software application 106 that is operative to retrieve one or more user interface documents and output a corresponding user interface responsive to the types or capabilities of the input devices designed to interact with the user interface. For example the front display device 108 is associated with function key input devices 110 and 111. The rear display device 112 is associated with a mouse device 114. The exemplary embodiment of the document viewer software application 106 is operative responsive to the document 100 to generate a first maintenance user interface 102 that includes labels 116 and 118. The labels 116 and 118 indicate the function of adjacent function keys 110 and 111. In addition the document viewer software application 106 is further operative responsive to the document 100 to generate a second maintenance user interface 112 that includes user interface elements such as a scroll bar 120 and buttons 122 that can be manipulated with mouse pointer 124 associated with the mouse device 114.

The user interface document 100 includes a plurality of command instructions 126 that specify features that are to be included in each user interface generated by the document. These command instructions 126 are generally input device neutral, which enable the document viewer to determine which types of user interface elements would best correspond to the command instructions for particular types of input devices. Thus for a corresponding action command instruction 127, the document viewer 106 is operative to generate two or more different types of user interface elements. For example at the front display device 108 with associated function keys 110, the exemplary document viewer 106 is operative to generate a select label 132 which identifies the correct function key 134 to press to perform the action specified by the command instruction 127. For the rear display device 112 with associated mouse device 114, the exemplary document viewer 106 generates a mouse clickable button 136 for the same action command instruction 127.

The command instructions of the user interface document 100 are also operative to specify one or more event processor software components 128. Event processors 128 are operative to handle events that occur with respect to user interfaces generated by the document viewer software application 106. The event processors include software functions that are operative responsive to user interface events to control hardware 130 such as transaction function devices, and other software applications of the automated banking machine. For example, when a key pressed event or button-clicked event occurs which corresponds to the command instruction action 127, the document viewer is operative to call a specified event processor to process the event. The event processor may be operatively programmed to manipulate hardware such as a transaction function device (e.g. a cash dispenser). The event processor may also send or retrieve information from a host, a database or other source. In general exemplary event processors are operative to perform any function that can be performed by software applications executed in the computer responsive to user interface events.

The event processors may return data to the document viewer and may manipulate the output of a user interface by the document viewer. For example if an event processor determines that a user has initiated an event to show a new user interface page or window, the event processor is operative to have the document viewer load another user interface document that is representative of the new user interface page or window. In addition an event processor is operative to manipulate individual properties of user interfaces being output by the document viewer. Examples of such manipulations include the changing of the visibility of user interface elements or the modification of text within a label or text box.

Figure 5:
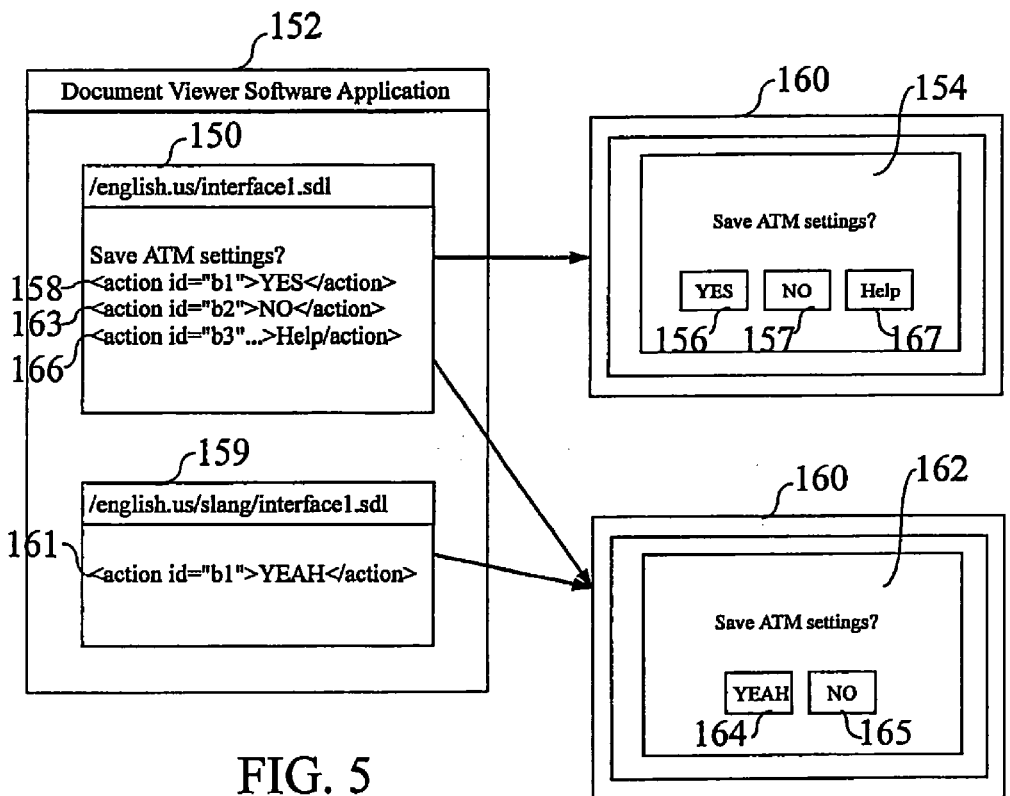
FIG. 5 is a schematic view representative of an exemplary document architecture for language translations.

Exemplary embodiments of the present invention are operative to output user interfaces in a plurality of different human languages. Although customized user interfaces may be programmed for each different human language, the exemplary embodiment of the present invention is operative to automatically translate a user interface responsive to the desired human language of the user. FIG. 5 shows an exemplary user interface document 150 that was originally designed to generate user interfaces in the human language of U.S. English. The exemplary document viewer 152 is operative to generate a first user interface 154 responsive to the document 150 in a display device 160. Here the user interface document 150 includes an action command instruction 158 that includes the U.S. English label "YES". If the preferred natural language of the consumer using the machine is U.S. English, the document viewer software application does not need to perform a translation and the corresponding user interface element 156 is generated as a button with the "YES" label. However, if the preferred natural language of the consumer using the machine is a different language or dialect, the document viewer responsive to both the parent user interface document 150 and a corresponding translation user interface document 159 is operative to generate a second user interface 162 that has been translated into the preferred language of the consumer. Language selection can be made in a variety of ways in embodiments of the invention. Language may be set by programming certain terminal parameters. Alternatively users may have associated data accessible in the system that corresponds to particular language data. Alternatively, the machine may operate to allow user selection of language during a transaction sequence. Multiple language and dialect capabilities may be provided for both the consumer and maintenance user interfaces.

In the exemplary embodiment language translation is accomplished through the use of a plurality of translated user interface documents which share the same file name but are stored in separate subdirectories. In general the subdirectory names correspond to the translated language or dialect. Thus, in the exemplary embodiment each set of transaction documents for a particular language are stored in their own individual subdirectory on the automated banking machine. However, it is to be understood that other document storage systems may be used to organize language related user interface documents including a database and/or web server.

Figure 6:
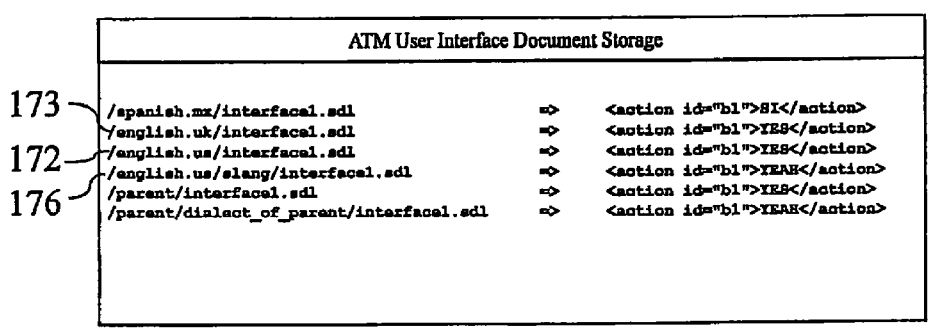
FIG. 6 is a further schematic view representative of an exemplary document architecture for language translations.

FIG. 6 is representative of an exemplary listing of user interface files 170 showing their relative file system paths. Each language for a particular country includes its own subdirectory. Dialects for a country's language are stored in child subdirectories. Thus user interface documents for U.S. English and U.K. English are stored in subdirectories such as "/english.us/" 172 and "/english.uk/" 173 respectively. User interface documents for a dialect of U.S. English that includes common vernacular or slang may be stored in a child subdirectory such as "/english.us/slang/" 176.

In the exemplary embodiment of the present invention the dialect versions of user interface documents do not need to include a duplicate set of command instructions as the parent user interface document. The dialect user interface documents only need to include command instructions that have been translated into a dialect or other language that is different than the parent language. For example as shown in FIG. 5 the U.S. English user interface document 150 includes command instructions 158 and 163 for generating both a "Yes" button 156 and a "No" button 157 in the user interface 154. The dialect user interface document 159 includes only a command instruction 161 for generating a "Yeah" button 164 in the translated user interface 162. The dialect user interface document 159 does not need to include a command instruction for generating the "No" button 165. The document viewer generated the "No" button 165 using the original command instruction 163 from the parent user interface document 150. When generating the translated user interface 162, the document viewer 150 is operative to combine or blend the parent user interface document 150 for one language with the translated user interface document 159 for a dialect of the one language.

However it is to be understood that in the exemplary embodiment the document viewer is operative to replace command instructions in the parent user interface document with command instructions in the dialect user interface document which share the same identification value (ID). This substitution is performed to avoid the unnecessary inclusion of both a Yes button and a Yeah button in the same user interface for example. As shown in FIG. 5, the document viewer 152 is operative to substitute the "Yeah" button for the "Yes" button by determining that both command instructions 158 and 161 include a common action ID value of "b1". As a result the document viewer knows that the "Yeah" button is meant by the designer of the child user interface document 159 to replace the original "Yes" button 156.

Although the exemplary dialect user interface document 159 is shown with less command instructions than the parent user interface document 150, in the exemplary embodiment of the present invention, the dialect user interface document can include additional command instructions that do not appear in the parent user interface document. Such additional command instructions may be used to add additional images, text descriptions or other action commands to the translated user interface 162 that are not found in the parent user interface 154.

Although the exemplary translated user interface 162 is generated from a combination or blending of command instructions from both the parent and dialect user interface documents 150 and 159, the system may be operative to prevent certain command instructions from being inherited by the dialect user interface by including one or more special characters in the command instruction. In the exemplary embodiment the special characters are a series of three periods " . . . ". For example the parent user interface document 150 includes the command instruction 166 with the three periods. When generating the parent user interface 154, the document viewer is operative to generate a corresponding user interface element 167 in the form of a button labeled "Help". However, because the command instruction 166 includes the three periods, the document viewer is operative to not include a Help button in the translated user interface 162.

Although only translations using only two documents have been shown, it is to be understood that the above exemplary translation procedure can be used for a plurality of language related documents. For example many countries have a plurality of official languages. As a consequence a series of translated user interface documents can be created which start with the most commonly known language and is associated with progressively less well known languages and dialects.

In alternative exemplary embodiments of the present invention, other architectures for storing translated labels and/or command instructions may be used. For example in an alternative embodiment, the default user interface document itself may include one or more translations for each command instruction label in the user interface document. Such translations may be stored in an XML hierarchy that includes a description of the translated language, the translation for the label, and the "ID" value of the command instruction the translated word or words are intended to translate.

It should further be understood that while the exemplary embodiment is used in connection with visual outputs the principles described may be applied to other output types and combinations of visual and other outputs. For example, such principles may be applied to providing voice guided operation of an automated machine in selected languages and dialects.

In the exemplary embodiment of the present invention, consumer and maintenance applications are displayed through the front display device by outputting a user interface screen or window for the application on the portion of the desktop environment that is being output by the front display device. A conventional behavior of a multi-monitor configuration software often enables the desktop to be seen by a user when an application is not being displayed over that portion of the desktop. Thus when a user interface application is closed or exits prematurely, the underlying portion of the desktop environment will be visible. This behavior is sometimes undesirable because it allows consumers to see aspects of the underlying operating system architecture of the automated banking machine whenever the consumer program terminates.

Figure 7:
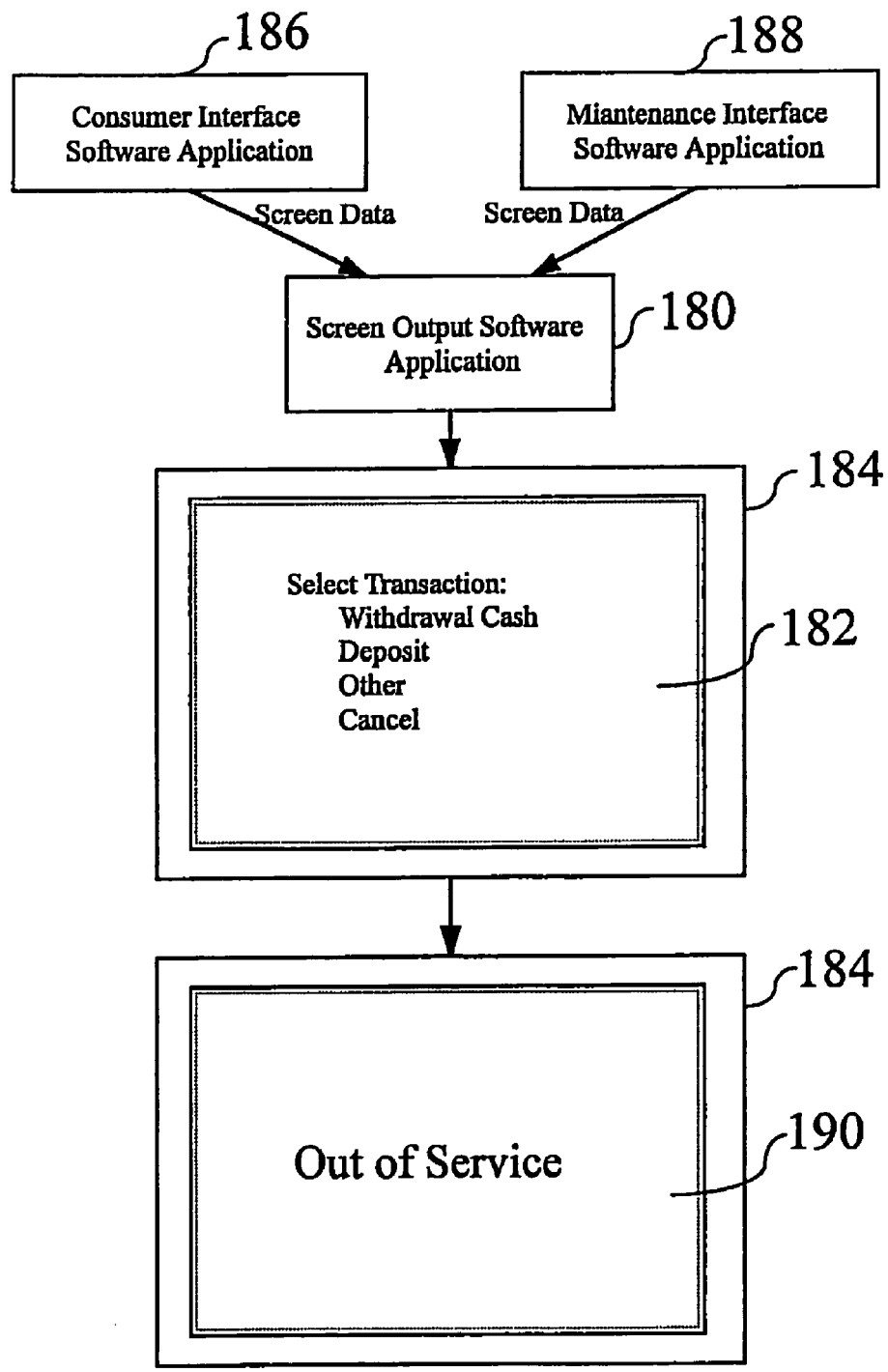
FIG. 7 is a schematic view representative of an exemplary screen output software application of the present invention.

The exemplary embodiment of the present invention prevents the underlying desktop from being displayed with the front display device by using a screen output software application. FIG. 7 is representative of exemplary screen output software application 180, which is operative to generate at least one user interface screen 182 over the entire area of the desktop environment being output by the front display device 184. In the exemplary embodiment the consumer interface software application or the maintenance interface software application 188 are operative to pass corresponding consumer and maintenance user interface screens to the screen output application 180 for output on the front display device 182. In the exemplary embodiment the screen output device uses a drawing API of the operating system, such as Microsoft®'s Direct Draw and Direct Show, to create screens 182 responsive to the consumer and maintenance user interface application.

The screen output software of the exemplary embodiment is an independent program from the consumer and maintenance user interface applications 186 and 188. By separating the screen output application 180 across process boundaries from other applications, the screen output is operative to remain running and active when either, or both of the consumer and maintenance user interface applications terminate unexpectedly due to an error or other computer bug. The screen output application 180 is further operative to detect when the consumer interface application 186 has terminated. When this condition is detected, the screen output application 180 is operative to automatically cause the computer to display a screen 190, which includes indicia representative of the ATM being out-of-service. Such detection can occur in response to the consumer interface application 186 sending the screen output application 180 an exit message when it closes. Also the detection can occur as a result of the screen output application 180 determining that a consumer interface application 186 is no longer running or is no longer able to communicate with the screen output application 180. Such an out-of-service screen in the embodiment shown has a size which generally covers the entire area of that portion of the desktop being output by the front display screen 184.

In the exemplary embodiment when the automated banking machine is manually taken down for servicing, the maintenance interface application 188 is operative to send the screen output application 180 a message, which prompts the screen output application to display the out-of-service screen 190. When the servicer has completed servicing the machine, the maintenance interface application is operative to send the screen output software a further message, which instructs the screen output application to redisplay screens for the consumer interface software application 186.

In the exemplary embodiment of the present invention, the exemplary terminal control software components are backwardly compatible with older versions of ATM terminal control software. Thus when the exemplary embodiment of the present invention is substituted for an older prior art ATM, the present invention is operative to communicate with a host banking system in the same manner as the prior art ATM and is operative to functionally generate the same consumer user interface screens as the prior art ATM. To achieve backward compatibility with older ATMs, the exemplary embodiment is operative to process escape code sequence messages from the host like older ATMs.

For example some prior art ATMs include the ability to display different color palettes responsive to escape code sequence messages. In the prior art, computer displays are limited to displaying sets or palettes of 256 colors, out of a possible 16+ million colors. Some ATMs are operative to perform palette animation, whereby the colors of the screen are quickly changed between a plurality of different palettes to achieve certain visual effects such as animation. However, the exemplary embodiment of the present invention is operative to output user interfaces in resolutions of 16+ million colors through both the front and rear display devices. Although it is possible to configure the video display of the front display device for only 256 colors, doing so may produce undesirable color changes and artifacts in the rear display.

Figure 8:
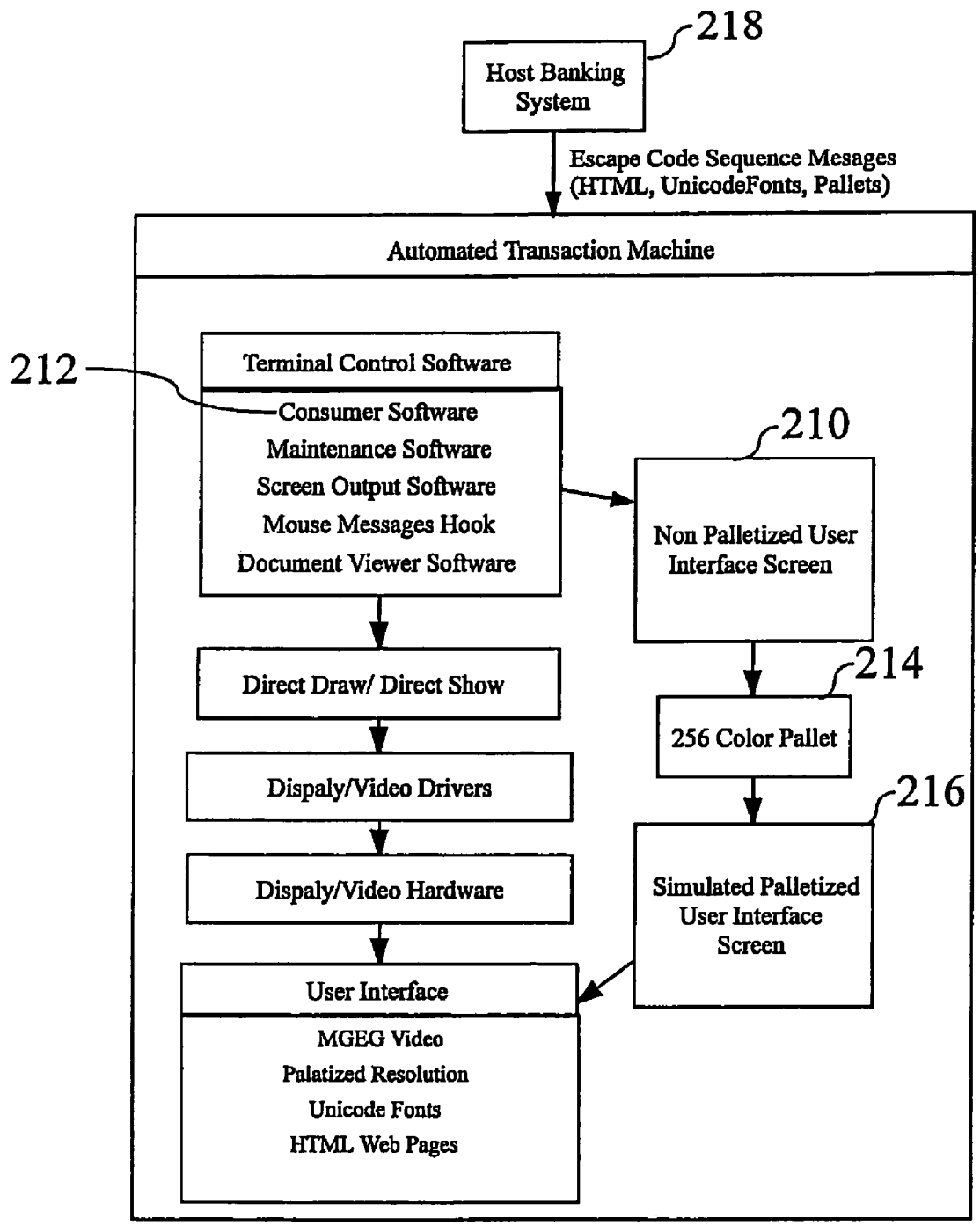
FIG. 8 is a schematic view representative of an exemplary software and hardware architecture which provides backward compatibility with existing host banking systems.

As shown in FIG. 8, the exemplary embodiment of the present invention includes the ability to simulate a palette type or "palletized/consumer user interface", on a front display device configured for nonpalettized resolutions. Palettization is achieved by first generating a nonpalettized user interface screen 210. For each of the plurality of pixels which make up the screen, the pixel color of the nonpalettized user interface screen 210 has substituted therefore a pixel color selected from a palette 214. The exemplary consumer user interface software application 212 is operative to substitute a determined corresponding pixel color for each pixel selected from a palette of 256 colors. The resulting palletized user interface screen 216 is then output through the front display device. The exemplary embodiment of the present invention is thus enabled to continue accepting prior art palette escape code sequences and to generate corresponding simulated palletized consumer user interfaces.

In addition to maintaining backward compatibility with prior art escape code sequences, the exemplary embodiment of the present invention extends the number of prior art escape code sequences to include escape code sequences for generating consumer user interfaces with unicode fonts and HTML formatted screens. Such escape code sequences for displaying palettes, unicode fonts and HTML may be received from a host banking system 218 or may be stored locally on the automated banking machine.

Figure 10:
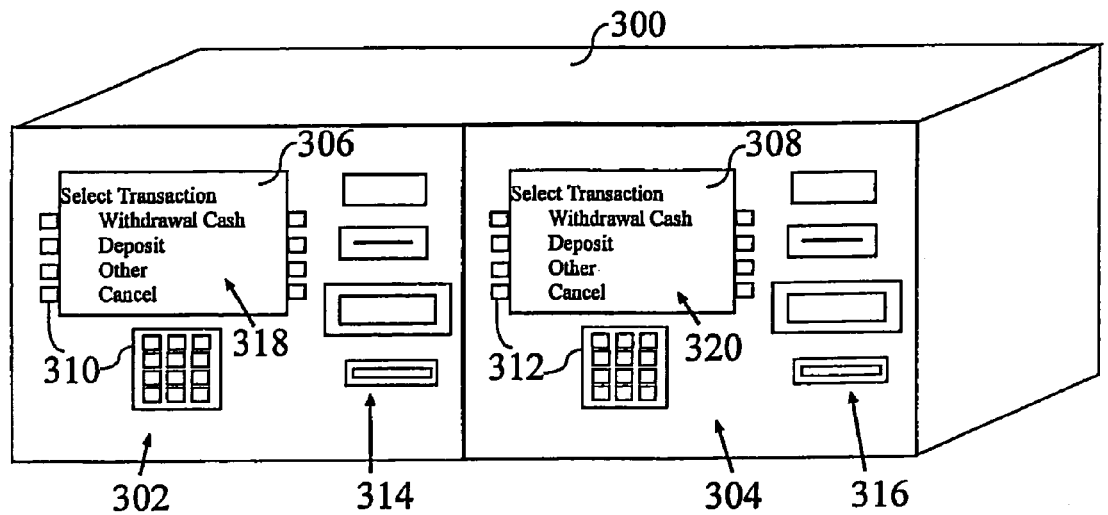
FIG. 10 is perspective view of an alternative exemplary embodiment of the present invention with multiple consumer user stations.

In addition to providing an ATM with a consumer user station and a maintenance user station, alternative exemplary embodiments of the present invention may provide an automated banking machine with a plurality of similar or different types of user stations. For example FIG. 10 shows an exemplary ATM 300 with two consumer user stations 302, 304. Each consumer user station includes its own set of display devices 306, 308, input devices 310, 312, and transaction function devices 314, 316. Here the ATM 300 includes a computer that is operative to cause the display devices 306, 308 to each display different portions 318 and 320 of a common desktop environment. One or more software applications operative in the computer may then generate a consumer user interface in each desktop portion 318, 320, enabling a plurality of consumers to perform transaction functions at each user station at the same time with the ATM 300.

In addition to positioning each consumer user station adjacent to each other as shown in FIG. 10, further alternative exemplary embodiments may have each consumer user station positioned on different sides of the ATM 300, on different sides of a wall, in different rooms, or in any spatial relationship that enables multiple consumers to perform banking transactions with the ATM 300 simultaneously. For example, an exemplary ATM may be configured with one user station that is positioned for use by consumers in a standing position, while a second consumer user station may be configured closer to the ground for consumers using a wheelchair.

Further exemplary embodiments of the present invention may be configured with different types of consumer user stations. For example one user station may be configured for performing conventional banking transactions such as the withdrawing of cash, while one or more other consumer user stations may be configured for other types of transactions such as purchasing tickets, bill payment, and information retrieval.

Figure 11:
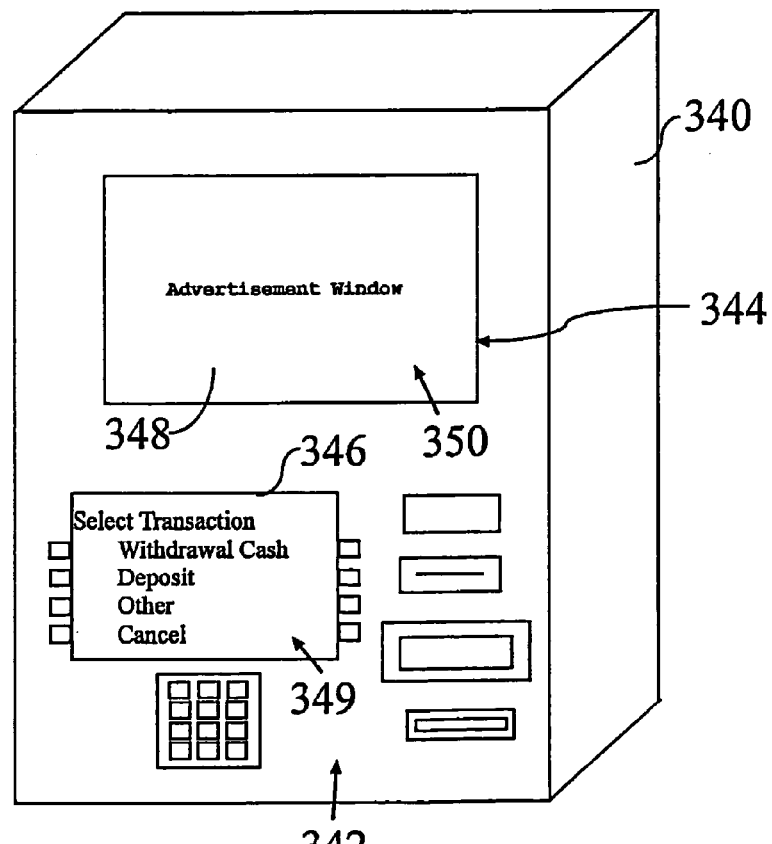
FIG. 11 is perspective view of an alternative exemplary embodiment of the present invention with a consumer advertisement display.

FIG. 11 shows another alternative exemplary embodiment of the present invention. Here an exemplary ATM 340 includes a consumer user station 342, and a presentation station 344. Each station includes a display device 346, 348. A computer is operative to cause each display device 346, 348 to output different portions 349, 350 of a common desktop environment. In this described exemplary embodiment, the presentation station is positioned so that multiple consumers near the ATM can see the advertisement display device 348 while another consumer is using the consumer user station 342. The ATM may then be operatively configured to output audio visual presentations through the presentation display device 348 which are designed to attract consumers to the ATM and/or are designed to advertise different products and services to consumers waiting in line to use the ATM 340. Alternatively multiple display devices may be used for other functions such as for providing images of instruments such as checks being deposited in the ATM, or checks, money orders or tickets being produced by the ATM.

The exemplary embodiment of the present invention may be used in conjunction with a novel method for generating terminal control software components for a plurality of different ATM platforms. Each development tool compiler for each of a plurality of different targeted ATM platforms is organized and stored on an individual portable medium in a form that enables a developer workstation to execute the compiler from the portable medium. In the exemplary embodiment, the portable medium is a CD-ROM disk. However, in alternative exemplary embodiments any portable medium with sufficient space to store an executable software compiler can be used. Other exemplary portable mediums include DVD disks, optical magnetic disks, Zip disks, PCMCI memory cards, static memory cards, flash memory cards and removable hard disks. Alternatively other approaches to effectively connecting and disconnecting a compiler from a workstation may be used.

Each portable medium is associated with a configuration script, that when executed is operative to configure a workstation so as to be able to run the compiler from the portable medium. In the exemplary embodiment the configuration script is also stored on the portable medium as it is with the corresponding compiler. However, in alternative embodiments the configuration script may be stored on the workstation or on a shared network server.

Figure 9:
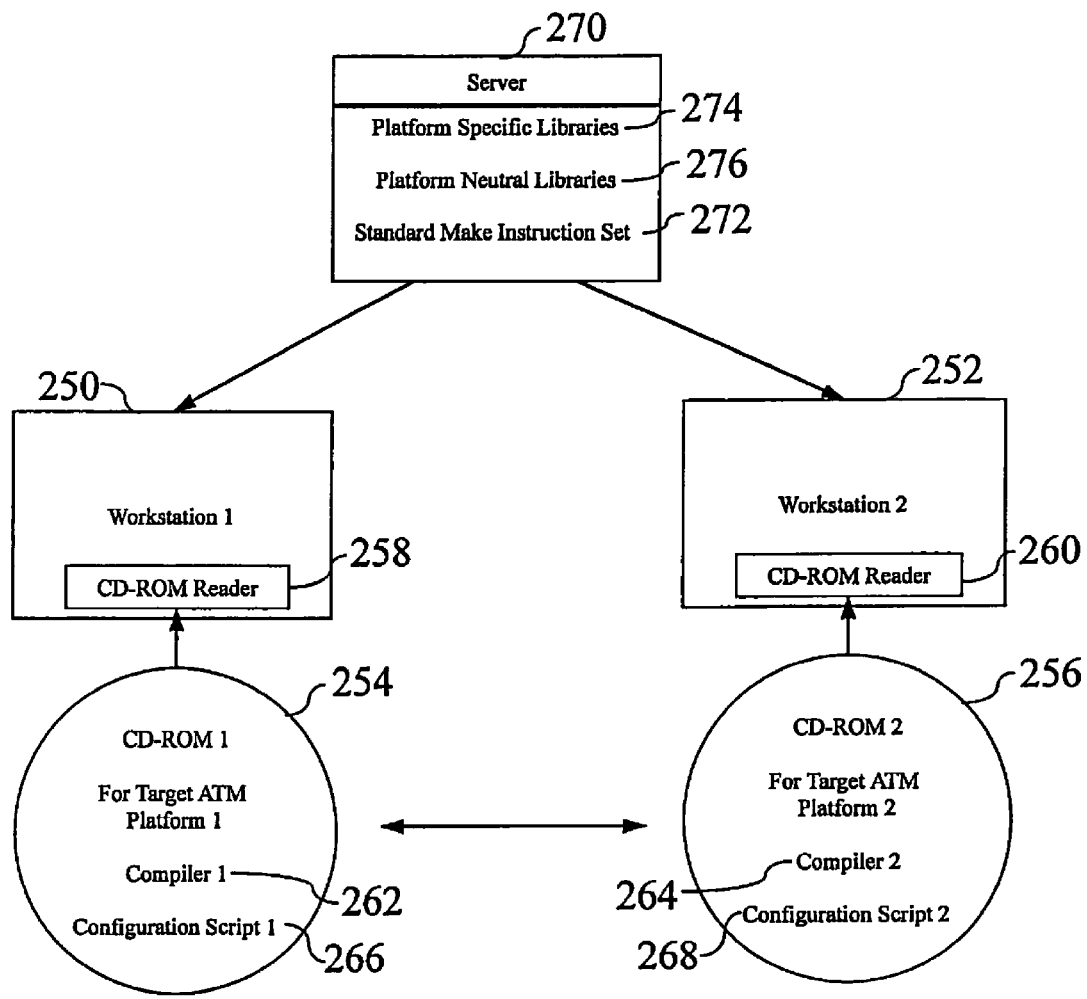
FIG. 9 is a schematic view of a system and method for compiling source code for a plurality of ATM platforms.

As shown in FIG. 9, portable mediums 254 and 256, with executable compilers 262 and 264 stored thereon, may be inserted into portable medium readers 258 and 260 for each developer workstation 250 and 252. Each workstation is operative to execute a configuration script 266 and 268 that corresponds to the executable compiler on each portable medium. After executing the configuration script, the workstations are properly configured to compile ATM source code by executing the compiler from the portable medium.

In the exemplary embodiment, each workstation is operative to communicate with a shared network server 270, which includes storage for a standard make instruction set 272, platform specific libraries 274 and platform neutral libraries 276. The platform specific libraries include ATM software components designed for use with specific ATM platforms. For example, the platform specific libraries 274 may include both a Microsoft® NT library of MPEG video display functions and an IBM OS/2 library of MPEG video display functions. Each library is specifically designed to be incorporated in forms of ATM software, targeted for different platforms such as either a Microsoft® NT operating system or an IBM OS/2 operating system.

The platform neutral libraries include common ATM software components that are operative for use with a plurality of different ATM platforms. Such platform neutral libraries may include functions and classes that reference common functions found in the platform specific libraries 274. For example, a video display platform neutral library may be operatively programmed to interface with either the platform specific Microsoft® or IBM MPEG video display functions. New software components that are designed to interface with the platform neutral libraries may then be reused in a plurality of different platform specific ATM applications.

In the exemplary embodiment of the present invention, the standard make instruction set 272 is operatively organized to specify which platform specific and platform neutral libraries are associated with which targeted automated banking machine platforms. Each workstation 250 and 252 is operative to compile with ATM source code for a particular ATM platform, using their currently configured compiler 262 and 264, responsive to the standard make instruction set 272. Consequently each workstation can compile a common source code component into a plurality of platform specific ATM components.

In the exemplary embodiment this process is accomplished by generating the common source component for an automated banking machine. For a first targeted ATM platform, the developer places a first portable medium in operative connection with his workstation. The first portable medium includes a first executable compiler that is operative to compile the generated source code for the first targeted ATM platform. The developer runs a first configuration script that corresponds to the first executable compiler. The first configuration script is operative to configure the workstation to execute the first compiler from the first portable medium. Once the workstation is configured, the developer compiles the generated source code by executing the first compiler from the first portable medium, responsive to the standard make instruction set.

For a second targeted ATM platform, the developer exchanges the first portable medium for a second portable medium that includes a second executable compiler. The second compiler is operative to compile the generated source code for the second targeted ATM platform. The developer runs a second configuration script that corresponds to the second compiler. The second configuration script is operative to configure the workstation to execute the second compiler from the second portable medium. Once the workstation is re-configured, the developer compiles the generated source code by executing the second compiler from the second portable medium, responsive to the standard make instruction set. For each targeted ATM platform, the standard make instruction set is operative to direct the configured compiler to build an ATM application component that includes code that corresponds to the targeted ATM platform.

Thus the new automated banking machine and system of the present invention achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof.

Having described the features, discoveries and principles of the invention, the manner in which it is constructed and operated, and the advantages and useful results attained, the new and useful structures, devices, elements, arrangements, parts, combinations, systems, equipment, operations, methods and relationships are set forth in the appended claims.

We claim:

1. An automated banking machine that operates responsive to data read from data bearing records, comprising:
at least one computer;
at least one data store, wherein the at least one data store is in operative connection with the at least one computer;
a plurality of devices in operative connection with the at least one computer, including:
a card reader, wherein the card reader is operative to read card data from user cards, wherein the card data corresponds to financial accounts;
a cash dispenser, wherein the cash dispenser is operative to dispense cash stored within the automated banking machine to machine users;
a plurality of input devices, wherein the input devices include a first manual input device of a first type and a second manual input device of a second type that differs from the first type;
at least one output device, wherein the at least one output device includes a consumer display screen;
a consumer user station, wherein the card reader, cash dispenser, first manual input device and consumer display screen are machine user accessible at the consumer user station and operative in carrying out banking transactions through operation of the automated banking machine;
a maintenance user station, wherein the second manual input device is accessible at the maintenance user station and operative in carrying out at least one maintenance activity through operation of the automated banking machine;
wherein the at least one data store includes computer executable instructions including at least one markup language document, wherein the instructions included in the at least one markup language document are operative to associate computer executable instructions operative to cause the at least one computer to generate a user interface object and computer executable instructions operative to cause the at least one computer to carry out at least one device operation; and
wherein the computer executable instructions include at least one software component, wherein the at least one computer is operative responsive to data corresponding to the first manual input device, the at least one software component and the at least one markup language document to cause a first user interface to be output through the consumer display screen, wherein the first user interface includes a first user interface object, wherein the first user interface object is configured to be selectable through at least one manual input through the first manual input device;
and wherein the at least one computer is operative responsive to receipt of at least one input through the first manual input device and the at least one markup language document, to cause the automated banking machine to carry out the at least one device operation.

2. The machine according to claim 1,
wherein the maintenance user station further includes a maintenance display screen,
and wherein the at least one computer is operative responsive to data corresponding to the second manual input device, the at least one software component, and the at least one markup language document to cause a second user interface to be output through the maintenance display screen, wherein the second user interface includes a second user interface object different in visual appearance from the first user interface object, and wherein the second user interface object is configured to be selectable through at least one manual input through the second manual input device;
and wherein the at least one computer is operative responsive to receipt of at least one input through the second manual input device and the at least one markup language document, to cause the machine to carry out the at least one device operation.

3. The automated banking machine according to claim 2 wherein the first manual input device comprises at least one manually actuatable key.

4. The automated banking machine according to claim 3 wherein the second manual input device comprises a pointing device.

5. The automated banking machine according to claim 4 wherein the pointing device includes at least one of a touch screen, a mouse and a track ball.

6. The automated banking machine according to claim 5 wherein the at least one device operation includes a device maintenance operation.

7. The automated banking machine according to claim 6 wherein the at least one device operation includes a device maintenance operation of the cash dispenser.

8. The automated banking machine according to claim 2 wherein the at least one device operation includes a maintenance operation of at least one device of the automated banking machine, wherein the machine operation is carried out responsive to at least one manual input through the first manual input device and at least one manual input through the second manual input device.

9. The automated banking machine according to claim 1 wherein the at least one device operation includes operation of the cash dispenser.

10. The automated banking machine according to claim 1 wherein one of the first manual input device and the second manual input device includes a manually actuatable key and the other includes a pointing device.

11. A method of operating an automated banking machine that operates responsive to data bearing records, wherein the automated banking machine includes:
at least one computer;
at least one data store, wherein the at least one data store is in operative connection with the at least one computer;
a plurality of devices in operative connection with the at least one computer including:

a card reader, wherein the card reader is operative to read card data from user cards, wherein the card data corresponds to financial accounts;

a cash dispenser, wherein the cash dispenser is operative to dispense cash stored within the automated banking machine to machine users;

a plurality of input devices, wherein the input devices include a first manual input device of a first type and a second manual input device of a second type that differs from the first type;

at least one output device, wherein the at least one output device includes at least one consumer display screen;

a consumer user station, wherein the card reader, cash dispenser, first manual input device, and consumer display screen are machine user accessible at the consumer user station in carrying out banking transactions through operation of the automated banking machine;

a maintenance user station, wherein the second manual input device is accessible at the maintenance user station in carrying out at least one maintenance activity through operation of the automated banking machine;

wherein the at least one data store includes computer executable instructions including at least one markup language document, wherein the instructions included in the at least one markup language document are operative to associate computer executable instructions operative to cause the at least one computer to generate a user interface object and computer executable instructions operative to cause the at least one computer to cause at least one of the devices in the automated banking machine to carry out at least one device operation; and wherein the computer executable instructions include at least one software component, wherein the method comprises:
 (a) through operation of the at least one computer responsive to data corresponding to the first manual input device, the at least one software component and the at least one markup language document, causing a first user interface to be output through the consumer display screen, wherein the first user interface includes a first user interface object, wherein the first user interface object is configured to be selectable through at least one manual input through the first manual input device;
 (b) through operation of the at least one computer responsive to receipt of at least one manual input through the first manual input device and the at least one markup language document, causing the automated banking machine to carry out the at least one device operation.

12. The method according to claim 11,
wherein the maintenance user station further includes a maintenance display screen,
and wherein the method further comprises:
 (c) through operation of the at least one computer responsive to data corresponding to the second manual input device, the at least one software component and the at least one markup language document, causing a second user interface to be output through the maintenance display screen, wherein the second user interface includes a second user interface object different in visual appearance from the first user interface object, wherein the second user interface object is configured to be selectable through at least one manual input through the second manual input device;
 d) through operation of the at least one computer responsive to receipt of at least one manual input through the second manual input device and the at least one markup language document, causing the automated banking machine to carry out the at least one device operation.

13. The method according to claim 12 wherein in (b) and (d) the at least one device operation includes a maintenance operation.

14. The method according to claim 13 wherein in (b) the at least one manual input through the first manual input device includes receiving a key press input.

15. The method according to claim 14 wherein in (d) the at least one manual input through the second manual input device includes a pointing device input.

16. The method according to claim 15 wherein in (d) the pointing device includes at least one of a touch screen, a mouse and a track ball.

17. The method according to claim 15 wherein in (b) and (d) the maintenance operation includes an operation of the cash dispenser.

18. The method according to claim 12 wherein in (b) and (d) the at least one device operation includes operation of the cash dispenser.

19. The method according to claim 11 wherein the first manual input device includes at least one manually actuatable key, and wherein in (b) the at least one manual input includes receiving a key press input through the at least one manually actuatable key.

20. The method according to claim 11 wherein in (b) the at least one device operation includes an operation of the cash dispenser.

* * * * *